United States Patent [19]

Allen et al.

[11] Patent Number: 5,096,479
[45] Date of Patent: Mar. 17, 1992

[54] METHOD OF ENHANCING FUSED QUARTZ BODY PURITY

[75] Inventors: Joseph I. H. Allen, Newcastle-upon-Tyne; Ian G. Sayce, Northumberland; John A. Winterburn, North Shields, all of United Kingdom

[73] Assignee: TSL Group PLC, Wallsend, United Kingdom

[21] Appl. No.: 634,865

[22] PCT Filed: Aug. 17, 1989

[86] PCT No.: PCT/GB89/00960

§ 371 Date: Jan. 3, 1991

§ 102(e) Date: Jan. 3, 1991

[87] PCT Pub. No.: WO90/02103

PCT Pub. Date: Mar. 8, 1990

[30] Foreign Application Priority Data

Aug. 18, 1988 [GB] United Kingdom ................ 8819693

[51] Int. Cl.$^5$ ........................ C03C 23/00; C03B 20/00
[52] U.S. Cl. ................................... 65/30.1; 65/30.13; 65/18.4; 65/111; 65/136; 156/602
[58] Field of Search ........................ 65/30.1, 17, 30.13, 65/18.4, 111, 134, 136; 156/602

[56] References Cited

U.S. PATENT DOCUMENTS

| 3,485,613 | 12/1969 | Herczog et al. | 65/136 X |
| 4,654,065 | 3/1987 | Naumann et al. | 65/136 |
| 4,759,787 | 7/1988 | Winterburn | 65/30.1 |
| 4,824,458 | 4/1989 | Ettori | 65/30.13 |

FOREIGN PATENT DOCUMENTS 0237431 9/1987 European Pat. Off. .
59-169956 3/1983 Japan .

Primary Examiner—Robert L. Lindsay
Attorney, Agent, or Firm—Michael J. Striker

[57] ABSTRACT

The method of enhancing purity of a fused quartz body having opposed boundary surfaces, includes the steps of maintaining the body at a temperature above 1000° C. and at the same time applying a polarizing potential across the boundary surfaces by electrodes in contact with the boundary surfaces so that at least some of the residual impurity ions in it are made to migrate away from one of the boundary surfaces towards the opposite one of the boundary surfaces thereof and are subsequently discharged at the opposite boundary surface. To avoid surface contamination or deformation each of the electrodes is a gaseous electrode of an at least partially ionized helium, argon, neon, krypton, xenon, nitrogen or hydrogen gas or a flame produced by combustion of hydrogen, methane, propane, butane or acetylene. The temperature during the maintaining step is advantageously from 1500° C. to 2100° C., the polarizing potential applied across the boundary surfaces advantageously exceeds 10 volts per mm body thickness and the duration of the maintaining at these temperatures is at least 10 seconds per mm thickness.

9 Claims, 3 Drawing Sheets

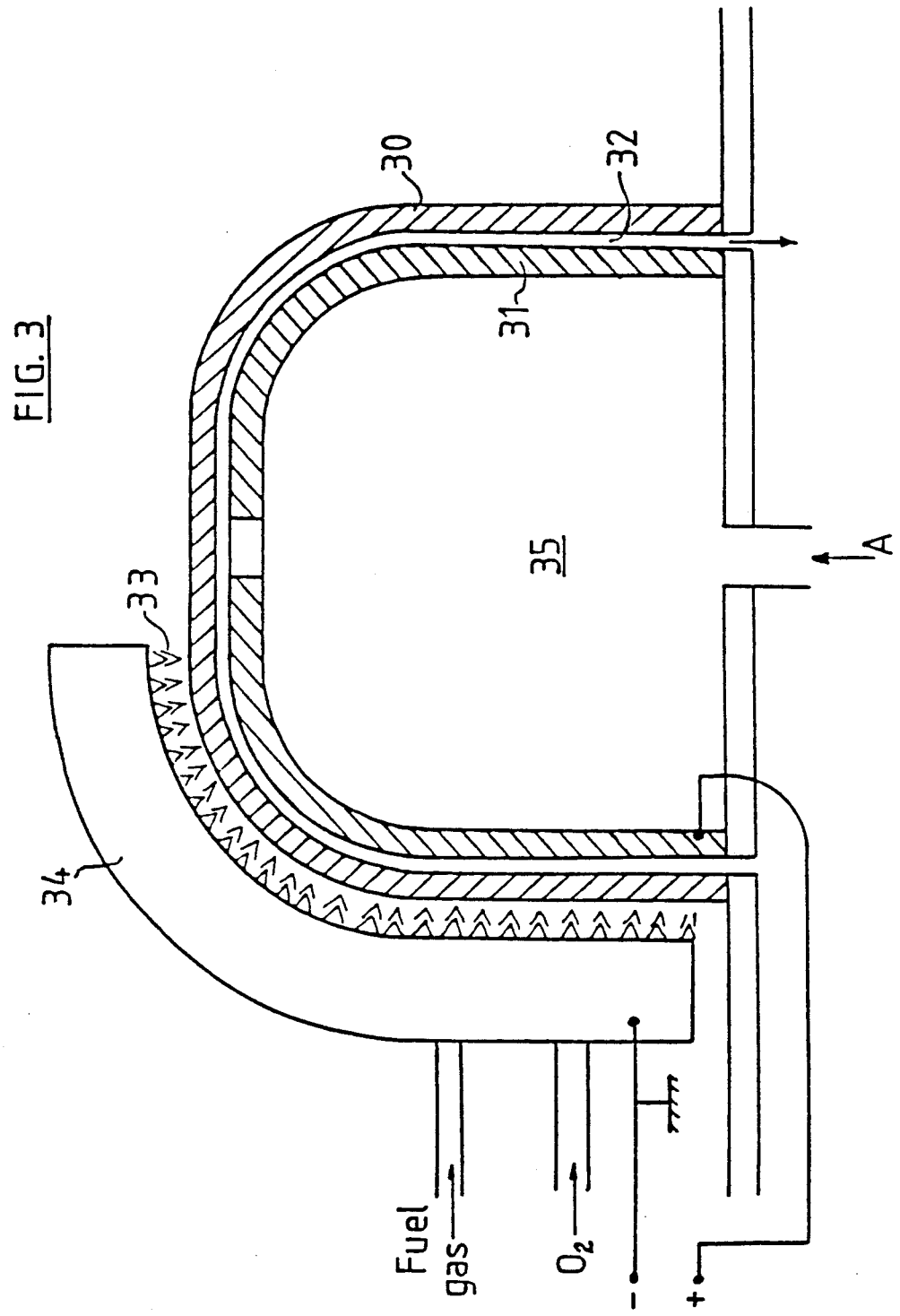

METHOD OF ENHANCING FUSED QUARTZ BODY PURITY

BACKGROUND OF THE INVENTION

This invention relates to a method of enhancing the purity of a body of fused quartz, e.g. vitreous silica, having opposed boundary surfaces, the method being of the kind, which includes the steps of comprising maintaining the body at a temperature above 1000° C. and at the same time applying a polarizing potential across the boundary surfaces by electrodes in contact with the boundary surfaces so that at least some of the residual impurity ions are made to migrate away from one boundary surface towards the opposite boundary surface thereof and are subsequently discharged into the gaseous phase at the latter boundary surface. In particular the invention is concerned with an electrical purification method and articles purified by the method.

High purity vitreous silica (fused quartz) articles are commonly made by flame or electrical fusion of carefully refined powders derived from natural quartz crystal. With increasing attention being paid to residual impurities by certain industries, e.g. semiconductor and optical fibre manufacture, the level of purities sought is at times beyond that which can be achieved by conventional chemical and physical refinement techniques. There may even be an undesirable concentration of alkali ions, in articles manufactured from synthetic quartz or amorphous silica powders, either derived from the starting material or introduced accidentally as contamination in the manufacturing process.

For achieving very low levels of certain mobile metal ion impurities, notably ions of the alkali metals, e.g. lithium, sodium, potassium and copper, and the application of an electrical polarizing potential across the wall of a heated quartz article has been proposed (GB-A-2166434). This can effect migration of the impurity ions away from one of the wall surfaces, and toward the opposite wall surface. The article may subsequently be cooled to ambient temperature while the polarizing potential is still applied, in which case the impurities accumulating near the cathodic wall surface may be removed by machining or etching off a thin layer at that surface to leave the remaining mass of vitreous silica of higher average purity.

In one example included in the above-noted patent application, a method was described in which a vitreous silica crucible was inverted over an internal graphite mould and the crucible was rotated slowly while being heated wtih an oxy-propane burner. An electric potential of 4.5 kV was applied with the mould serving as negative electrode and the burner flame as positive electrode. Significant depletion of alkali metal ions was observed in the inner layers of the crucible, but while some coloration was observed in the flame due to the release of ions electrolyzed from the crucible into the gas flame, significant amounts of alkali metal remained in the outer layers of glass.

SUMMARY OF THE INVENTION

The present invention represents an advance on the prior art and while it has several applications, it is particularly suited to the manufacture of fused quartz tubing, crucibles, and other hollow ware. The method of the invention may be applied to a finished tube or hollow ware, or in the course of drawing of the tube, or manufacture of the hollow ware or both during and after manufacture.

According to the present invention a method of the kind referred to of enhancing the purity of a body of fused quartz having opposed boundary surfaces, is characterised in that each of the electrodes is gaseous and at least partially ionized.

Whereas in the past one or both of the electrodes used for electrolysing fused quartz has been a solid in contact with a surface of the fused quartz, it has now been found that it is possible to effect purification of a mass of heated fused quartz, for example a tube, by non-contact means using hot conductive gas flows to serve as both positive and negative electrodes. This is particularly important in the purification of tubing for fibre optic applications, where any solid contact with the hot tube could cause unacceptable contamination or surface deformation.

It has furthermore been discovered that by using a hot conductive gas flow as the cathode, or negative electrode, and by ensuring that the cathodic surface of the mass of fused quartz is maintained at a sufficiently high temperature in a purging flow of gas, then it is possible to effect extensive volatilization of the mobile impurity cations which would otherwise accumulate at the cathodic surface. Although the method according to the invention can be operated with the body of fused quartz at a temperature of 1000° C., it proceeds increasingly rapidly with higher temperatures, the preferred range being from 1500° C. to 2100° C. The rate of movement of impurity ions towards the opposite boundary surface is also dependent on the polarizing potential applied and a potential difference of at least 10 V/mm thickness across the boundary surfaces is considered to be the minimum practical value.

The best known mobile impurities in vitreous silica are the ions of the alkali metals and of copper which may thus be substantially removed from a fused quartz article without the need for any solid contact with either surface of the article.

BRIEF DESCRIPTION OF THE DRAWINGS

FIG. 3 is a sectional view of a further embodiment of apparatus for performing a method according to the invention of enhancing the purity of a fused quartz crucible.

DESCRIPTION OF PREFERRED EMBODIMENTS

Figure 1:
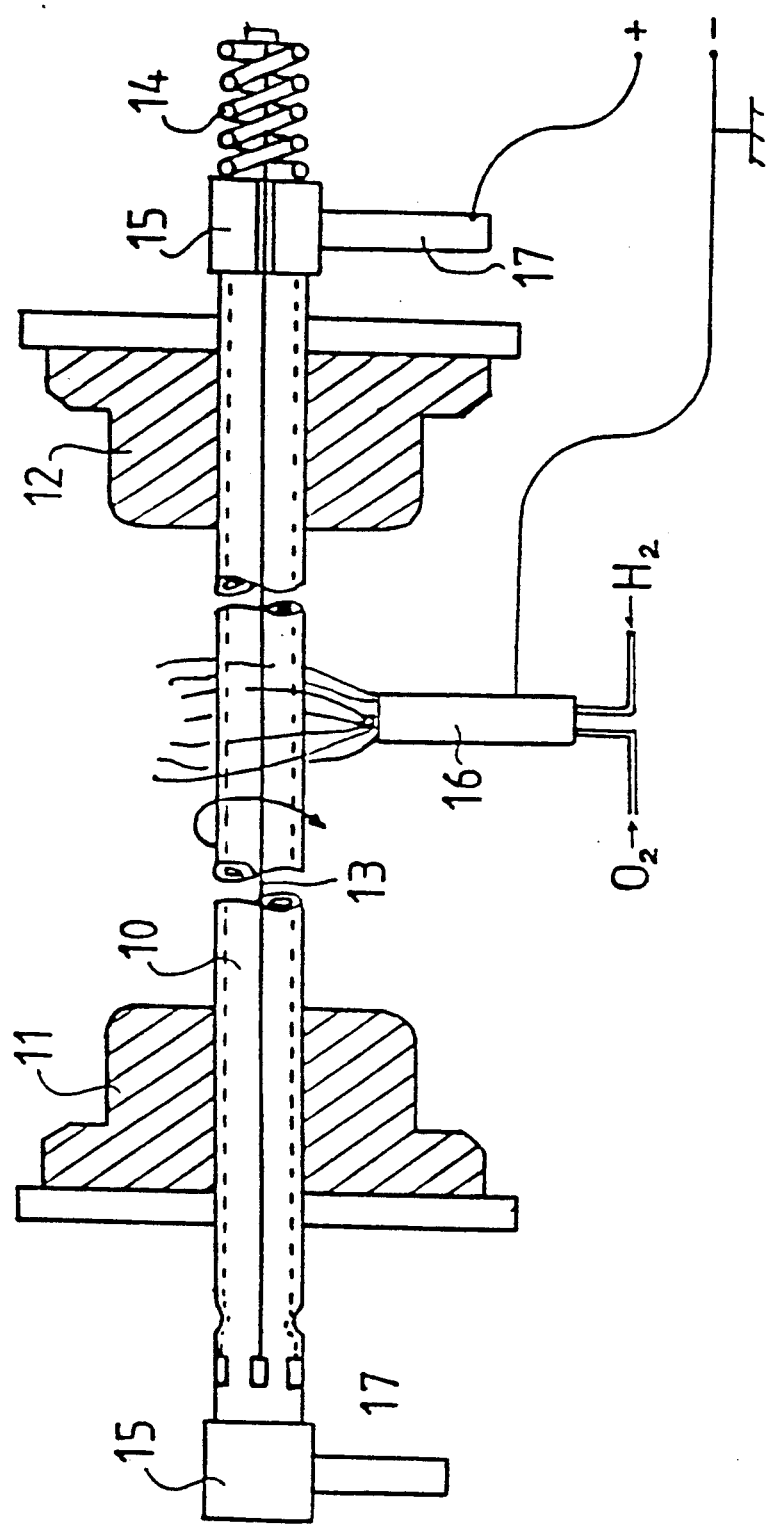
FIG. 1 is a partly sectioned schematic view of one embodiment of apparatus for performing a method according to the invention of enhancing the purity of a fused quartz tube.
Figure 2:
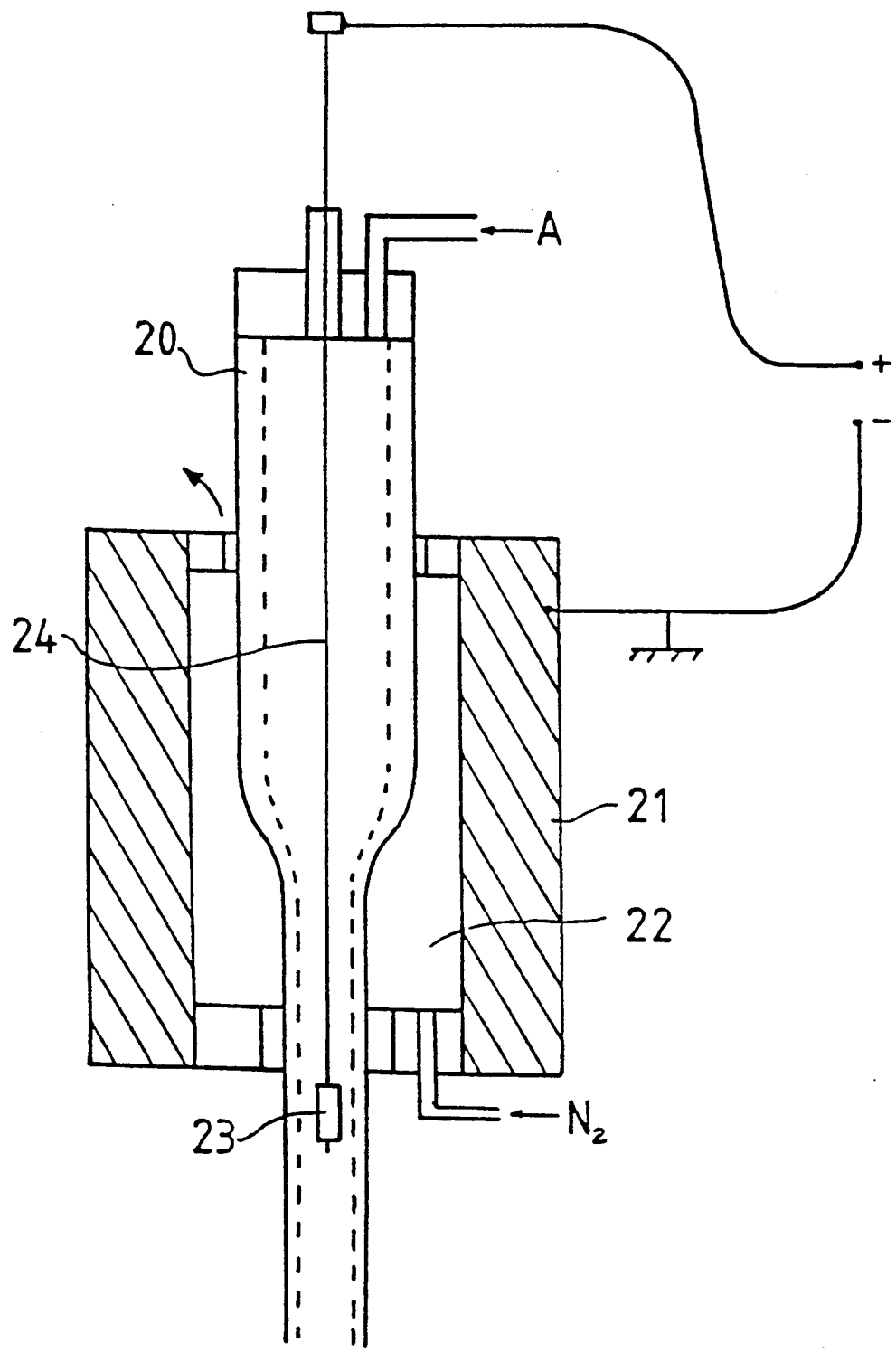
FIG. 2 is a sectional view of another embodiment of apparatus for performing a method according to the invention of enhancing the purity of a tubular article of fused quartz.

Various methods according to the invention of enhancing the purity of bodies of fused quartz are illustrated by the following examples which should be read with reference to the appropriate one of the accompanying drawings.

EXAMPLE 1 (SEE FIG. 1)

A fused quartz tube 10 of outside diameter 25 mm and inside diameter 19 mm was mounted between the chucks 11, 12 of a glass-working lathe. A wire 13 (e.g. of tungsten or molybdenum) was threaded through the tube bore and supported under slight tension along the tube axis by a spring 14. Gas fittings 15 and seals were provided in the tube bore so that argon gas (at a flow rate of 5 L/min) could be passed through the tube 10 while the latter was rotated in the lathe.

While thus rotating, the tube was heated by a metal oxy-hydrogen burner 16 (e.g. a semi-circular burner) to a temperature of 1600° C., determined by the flow of gases and the rate of traverse of the burner in the axial directions of the tube.

While the burner was traversed along the tube at a rate of 50 mm/minute, a potential of 3.5 kV was applied between the wire 13 as anode (positive electrode) via graphite brushes 17 and the metal burner 16 as cathode (negative electrode). A corona discharge was observed within the tube bore around the wire 13 in the hot zone. The argon flow within the tube bore both protected the wire 13 and also provided a conductive path for the electrolyzing current, (50 mA).

On application of the electrical potential a bright orange glow was observed in the burner flame which thus provided a conductive gaseous electrical contact with the exterior of the tube. Mobile metallic impurity ions were thus caused to diffuse through the fused quartz to the outer surface wall of the tube, where the hot gases stimulated vaporization of the impurity ions, at the zone of impingement of the flame with the external surface of the tube.

The above treatment permitted a substantial up-grading of the purity of the tube material with respect to the following mobile metal ions, lithium, sodium, potassium and copper, as demonstrated by the analytical results below (ppm by weight).

|    | Typical Starting Tube | Similar Tube after Treatment |
|----|----|----|
| Li | 0.34 | <0.01 |
| Na | 0.45 | <0.01 |
| K  | 0.11 | <0.01 |
| Cu | 0.01 | <0.01 |

EXAMPLE 2 (SEE FIG. 2)

A hollow cylindrical ingot 20 of fused quartz having a wall thickness of 45 mm was lowered through a high temperature graphite furnace 21, as conventionally used for redrawing an annular ingot to tubing, operating at a temperature of 2100° C. The interior 22 of the furnace was purged with nitrogen, and this gas surrounded the ingot providing a gaseous conductive path between it and the graphite furnace.

In the course of the redrawing process, a graphite bobbin 23 was lowered on a graphite cord 24 down the axis of the annular ingot 20 through the furnace hot zone. An atmosphere of argon was maintained within the ingot, to preserve the graphite parts and to provide a conductive path for the electrolysis current.

A potential of 1000 volts was maintained between the graphite cord 24 as anode, and the graphite furnace 21 as cathode, and a current of 0.6 amps was caused to flow.

An electrolytic purification of the fused quartz occurred in the course of the above redrawing process, as is shown by the analytical figures given below. Once again the impurities are expressed in ppm by weight.

|    | Tube without Electrolytic Current | Tube following Electrolytic Purification |
|----|----|----|
| Li | 0.4  | <0.01 |
| Na | 0.54 | <0.01 |
| K  | 0.20 | <0.01 |

Variations of the above process will be readily apparent to those skilled in the art.

Thus electrolytic purification in a lathe could be effected using either burner or plasma torch as heat source or gaseous electrode, alternatively a graphite or similar external furnace surrounding the tube in whole or in part could be employed.

The inner electrode could be replaced with a small internal burner, or plasma jet, or by alternative means of conduction, and the electrical polarity of the system may be reversed if required.

Again, the use of electrolytic purification in the course of redrawing of a larger ingot of fused quartz to a smaller sized product can be effected with alternative anode/cathode configurations, or the furnace may be replaced or supplemented by a flame or plasma heat source/electrode. Again the polarity of the system may be reversed if required.

EXAMPLE 3 (SEE FIG. 3)

A fused quartz crucible 30 having a wall thickness of 9 mm was inverted and placed over but not in contact with a hollow high purity graphite internal mould 31; the gap 32 between the mould 31 and the inner surface of the crucible 30 was uniformly about 5 mm.

The crucible and graphite were slowly rotated under an arrangement of ribbon flames 33 created by a water-cooled metal burner 34 fed with fuel gas and oxygen, and the crucible 30 was heated to a temperature of (about) 1500° C. A voltage of 2 kV was applied, between the burner 34 and the mould 31 such that the graphite mould 31 formed the anode and the metal burner 34 and its array of flames 33 formed the cathode of the electrolytic circuit. A current of 160 mA was caused to flow, and the flame was seen to glow bright orange.

The interior 35 of the mould 31 is filled with argon to serve as a protective atmosphere.

After this treatment, the crucible 30 was found to have a substantially reduced alkali content, as shown in the results below.

|    | Typical crucible untreated | Crucible after treatment |
|----|----|----|
| Li | 0.4  | <0.01 |
| Na | 0.3  | <0.01 |
| K  | 0.6  | 0.01 |
| Cu | 0.02 | <0.01 | all in parts per million by weight

Again, the example demonstrates the efficiency of electrolytic purification, whereby both anodic and cathodic connections to the quartz are gaseous, and the mobile metal ion impurities may be volatilized at the cathodic surface.

The method of the invention operates conveniently at atmospheric pressure, but operaton at higher or lower pressure is feasible. While argon respresents a convenient conductive gas for use within a hollow tube or ingot being electrolyzed, other gases may be used provided they yield a suitably conductive path under the conditions of temperature and pressure chosen for operation. In principle, any gas could be used to comprise the gaseous electrode, but it is preferable to employ a gas which is readily used, non-hazardous, and does not react deleteriously with any components in the system. The so-called noble gases may be conveniently employed as can nitrogen or hydrogen. Other gases or gas mixtures may also be used.

As noted above, a combustion flame may likewise provide a useful source of conductive gas to act as one or both electrodes in the system. Such combustion flames may typically be generated by any appropriate fuel gas-oxidant combination. The combination in air, or preferably oxygen, of one or more of the fuel gases hydrogen, methane, ethane, propane, butane or acetylene, may be conveniently utilised in the present application.

Radial flow of electrolytic current, and therefore ion diffusion is obviously preferred, but depending on the geometry of the article being purified, other geometrical arrangements of electrode and workpiece may be used if required. An arrangement of particular interest is that of a quartz glass plate, whereby it is possible to achieve electrolytic purification of at least the central regions of a plate of fused quartz by traversing the plate between a pair of gaseous electrodes as defined above, for example a pair of oxy-hydrogen ribbon burners may be employed, both to heat the plate and to provide the necessary conductive gas flows.

While the invention has been illustrated and described as embodied in a method of enhancing fused quartz body purity and fused quartz bodies obtained thereby, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In a method of enhancing purity of a body of fused quartz containing residual impurity ions and having opposing boundary surfaces, comprising the steps of maintaining the body at a temperature above 1000° C. and at the same time applying a polarizing potential across the boundary surfaces by electrodes in contact with the boundary surfaces so that at least some of the residual impurity ions are made to migrate away from one of the boundary surfaces towards the opposite one of the boundary surfaces thereof and are subsequently discharged into a gaseous phase at the opposite boundary surface, the improvement wherein each of the electrodes is gaseous and at least partially ionized.

2. The improvement as defined in claim 1, wherein the polarizing potential is poled to make alkali metal ions and copper ions migrate away from said one boundary surface and be discharged into the gaseous phase at said opposite boundary surface.

3. The improvement as defined in claim 1, further comprising heating the body to said temperature above 1000° C. by one of flame, an electric arc, a plasma jet and a furnace.

4. The improvement as defined in claim 1, wherein the fused quartz body is a member selected from the group consisting of a crucible, a hollow cylinder and a plate.

5. The improvement as defined in claim 1, wherein the fused quartz body is a hollow cylinder, and further comprising reshaping the hollow cylinder at the same time as said maintaining and said applying the polarizing potential to form another hollow cylinder of different diameter.

6. The improvement as defined in claim 1, wherein at least one of the gaseous electrodes is connected electrically to electrical circuit means for said applying via a refractory conductor made from a member selected from the group consisting of metal and carbon.

7. The improvement as defined in claim 1, wherein the gaseous electrodes used to apply the polarizing potential are each members of the group consisting of ionized helium, argon, neon, krypton, xenon, nitrogen and hydrogen and flames produced by combustion of hydrogen, methane, propane, butane and acetylene.

8. The improvement as defined in claim 1, wherein said temperature during said maintaining is from 1500° C. to 2100° C., the polarizing potential applied across the boundary surfaces exceeds 10 volts per mm of a thickness between the boundary surfaces and the duration of said maintaining is at least 10 seconds per mm of said thickness.

9. In a method of enhancing purity of a body of fused quartz containing residual impurity ions and having opposed boundary surfaces, comprising the steps of maintaining the body at a temperature above 1000° C. and at the same time applying a polarizing potential across the boundary surfaces by electrodes in contact with the boundary surfaces so that at least some of the residual impurity ions are made to migrate away from one of the boundary surfaces towards the opposite one of the boundary surfaces thereof and are subsequently discharged at the opposite boundary surface, the improvement wherein each of the electrodes is a gaseous electrode of an at least partially ionized gas selected from the group consisting of helium, argon, neon, krypton, xenon, nitrogen and hydrogen and flames produced by combustion of hydrogen, methane, propane, butane and acetylene, and wherein said temperature during said maintaining is from 1500° C. to 2100° C., the polarizing potential applied across the boundary surfaces exceeds 10 volts per mm of a thickness between the boundary surfaces and the duration of said maintaining is at least 10 seconds per mm of said thickness.

* * * * *